Nov. 3, 1942.     H. E. MORTON ET AL     2,301,171
CUTTING MACHINE
Filed April 22, 1941     3 Sheets—Sheet 2
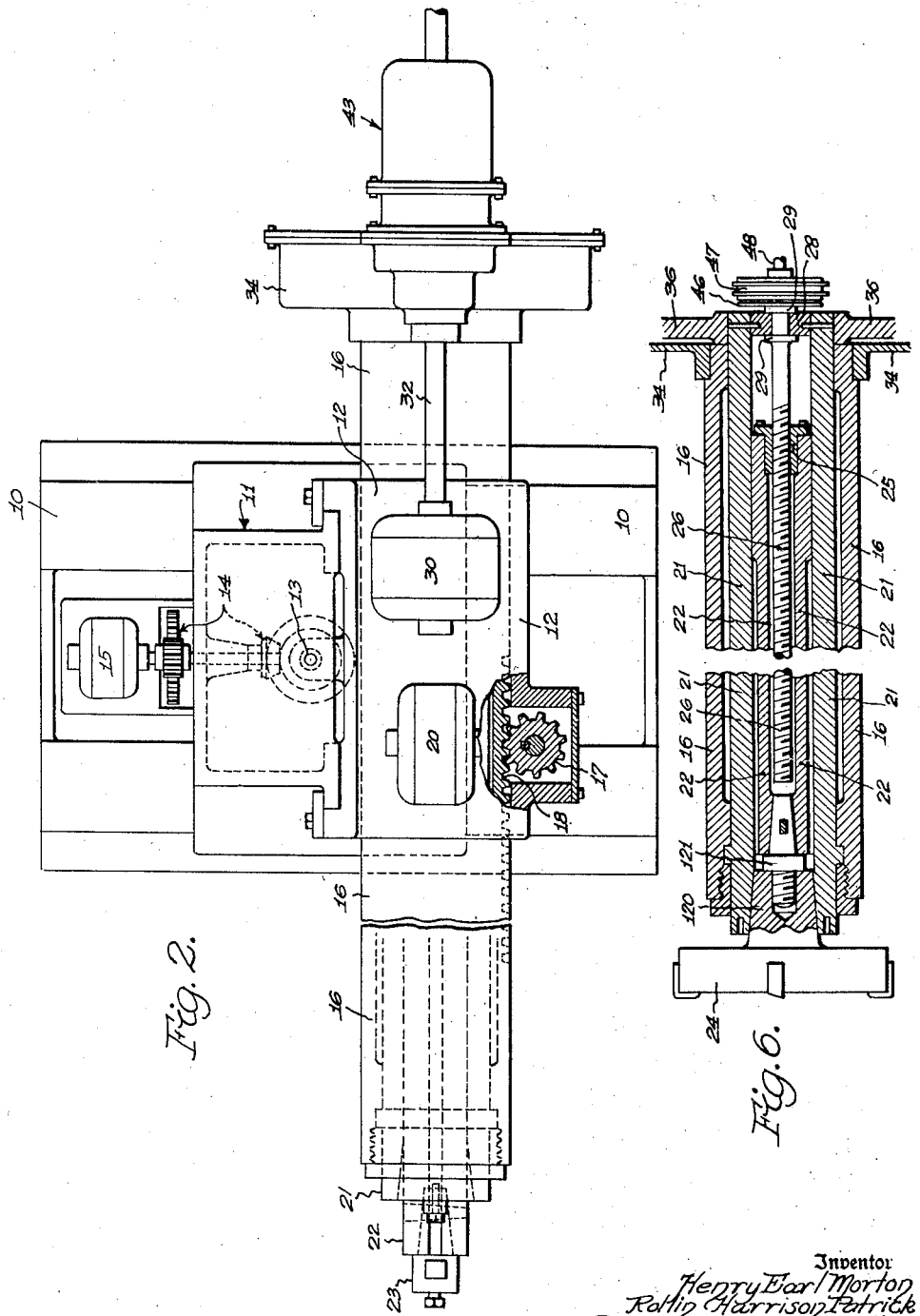

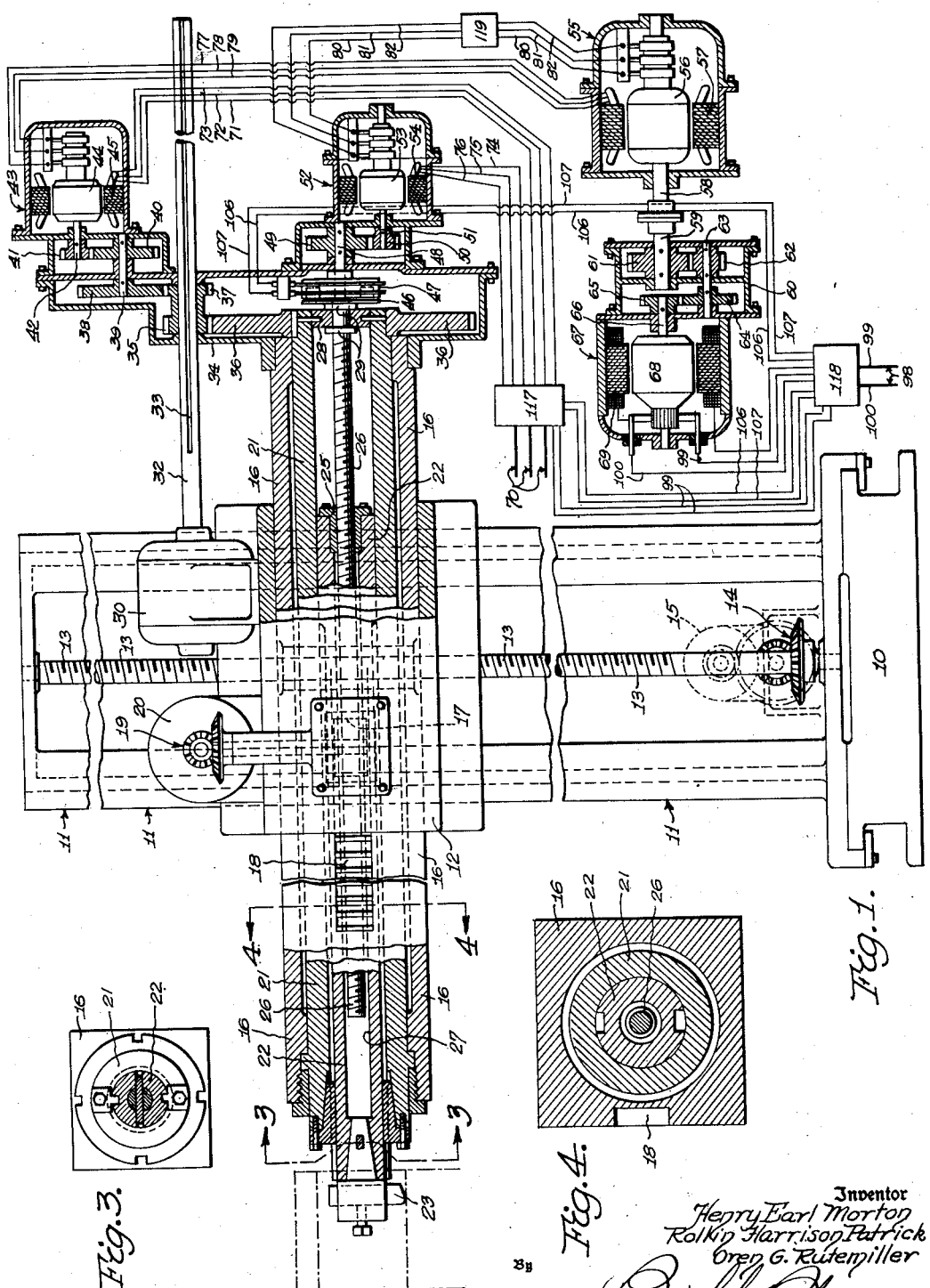

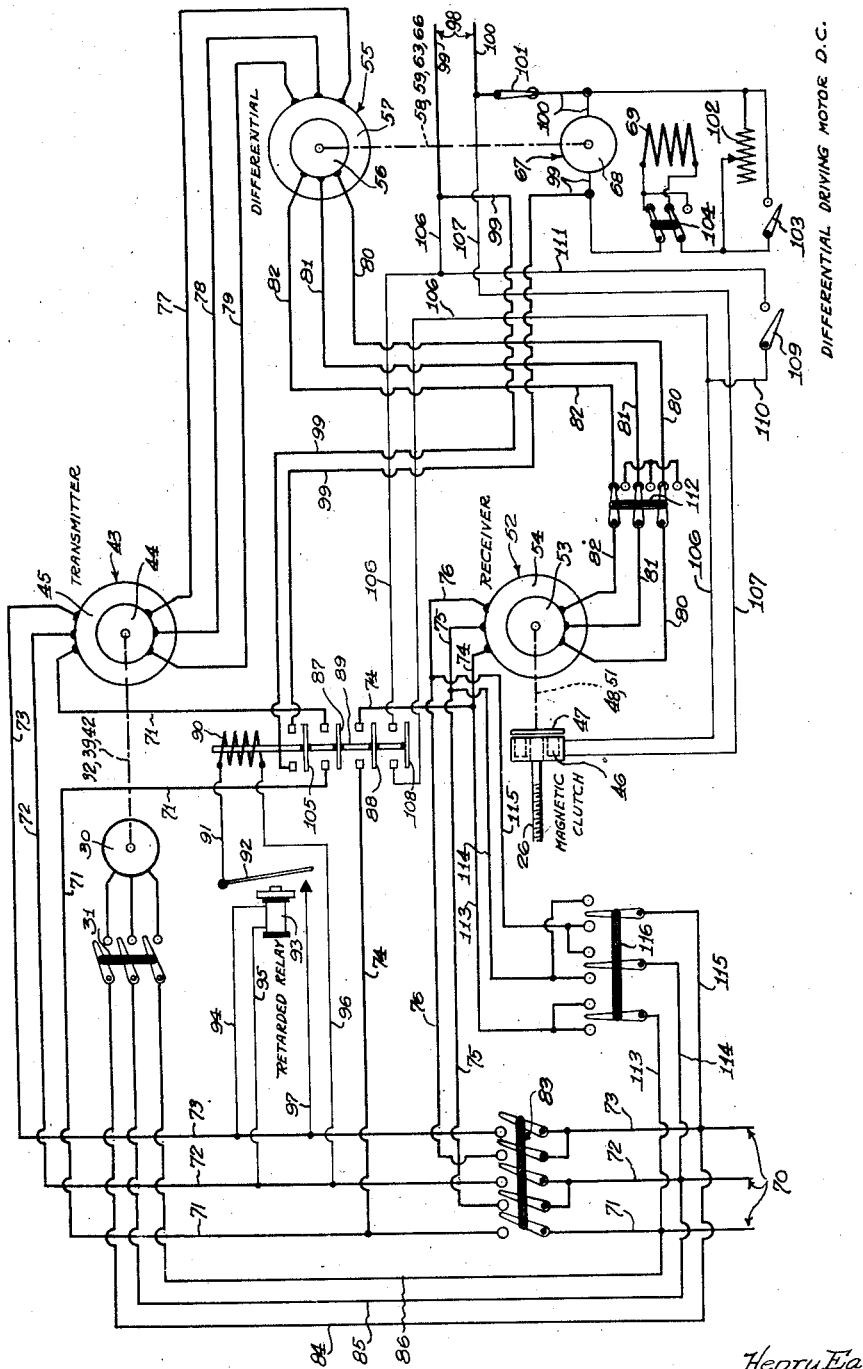

Patented Nov. 3, 1942

2,301,171

UNITED STATES PATENT OFFICE 2,301,171

CUTTING MACHINE

Henry Earl Morton, Muskegon, Rollin Harrison Patrick, Muskegon Heights, and Oren G. Rutemiller, Detroit, Mich., said Morton and said Patrick assignors to Morton Manufacturing Company, Muskegon Heights, Mich., a corporation of Michigan, and said Rutemiller assignor to Westinghouse Electric & Manufacturing Company, East Pittsburgh, Pa., a corporation of Pennsylvania Application April 22, 1941, Serial No. 389,818

18 Claims. (Cl. 29—26)

This invention relates, in general, to cutting machines and, in particular, to a new and improved tool driving mechanism therefor.

One of the objects of the present invention is to provide a new and improved cutting machine wherein tool manipulation and the control thereof are conducted with greater ease, efficiency and accuracy than heretofore and which machine is compactly and simply constructed.

Another object is to provide a new and improved cutting machine having a rectilinearly and rotatably movable tool and wherein such rectilinear and rotatable movements may be performed separately or jointly, as desired, and with the assurance that such desire will be fulfilled with the utmost accuracy.

Another object is to provide a new and improved cutting machine having a tool which is rectilinearly movable or immovable while being rotatably active or inactive and wherein whatever tool condition which is chosen may be faultlessly maintained until a change is intentionally effectuated, said machine being capable of accommodating such change with ease and rapidity.

Another object is to provide a cutting machine having a tool which is movable in any one of a plurality of manners or in any combination thereof responsive to proper operation of a new and improved mechanism which is controlled in new and improved manners.

Other objects and advantages of the invention will become readily apparent from a reference to the following specification taken in conjunction with the accompanying drawings of which there are three (3) sheets and wherein:

Figure 1 is a view, partly in elevation and partly in section, of the cutting machine showing the tool in substantially retracted position and the wiring between the various electrical devices which are employed;

Fig. 2 is a plan view of the showing in Fig. 1 and is partly broken away and in section to illustrate more clearly some of the details of the construction thereat;

Figs. 3 and 4 are sectional views taken along the lines 3—3 and 4—4, respectively, in Fig. 1;

Fig. 5 is a wiring diagram of the electrical system employed; and

Fig. 6 is a sectional view of the tool supporting structure employed in Fig. 1 but showing a different type of tool and its carrier in fully retracted position.

The apparatus herein disclosed and described is one which is particularly adaptable for various cutting operations, such as drilling, broaching, milling, reaming, planing, boring, facing, etc., and, except for its improvements, may be found thoroughly and clearly disclosed and described in a co-pending application entitled "Cutting machine," which was filed on December 11, 1939, by Henry Earl Morton and bears the Serial No. 308,592, which is now Patent No. 2,250,595, dated July 29, 1941. However, in an attempt to avoid the necessity of referring physically to the aforementioned application in order to understand in a general way the construction of the present apparatus, minus its improvements, it might be said that said apparatus comprises a main base 10 which may be either stationary or mobile and upon which is mounted, either stationarily or movably, a vertically upstanding super-structure, generally indicated at 11. Structure 11 is operable for supporting a hollow saddle 12 so that the latter may be moved, if desired, in either vertical direction relatively to the former under the influence of a vertically supported, rotatable screw 13 drivingly connected to said saddle and in driven connection with a gear train, generally indicated at 14, operatively connected to and driven by a motor 15 which is, for obvious reasons, preferably of the bi-directional, variable speed type.

As has been said, vertically movable saddle 12 is hollow so that it may internally carry an elongated support or ram 16 which is non-rotatable but preferably adapted for horizontal protraction or retraction in the direction of its length relatively to said saddle under the influence of a pinion 17 in driving connection with a rack 18 formed on the exterior of said ram and in driven connection with a gear train, generally indicated at 19, driven by a motor 20 which, for obvious reasons and like motor 15, is preferably of the bi-directional, variable speed type. Ram 16, like saddle 12, is hollow so that it may internally carry a similarly elongated support or arbor 21 which is so connected to said ram as to be protractible or retractible therewith but rotatable relatively thereto. Arbor 21, like saddle 12 and ram 16, is hollow so that it may internally carry a similarly elongated support or spindle 22 which is so connected to said arbor as to be rotatable therewith but protractible or retractible relatively thereto. The length of spindle 22 is preferably less than that of arbor 21 so that the former may, when desired, be positioned totally within the latter, and the forward end of said spindle is devoted to and adapted for the purpose of carrying a tool of any desired design (such as that shown at 23 in Fig. 1 or at 24 in Fig. 6), while the rear end thereof has centrally fixed thereto a nut 25 to which an elongated, rotatable screw 26 is drivingly connected and through which said screw extends into an axially elongated bore 27 formed in said spindle. Screw 26 is prevented from moving axially relatively to ram 16 and arbor 21 by means of a bearing 28 in which the rear end of said screw is journalled for rotation between collars 29 formed on said crew, said bearing being carried at and by the rear end of said arbor so that it may rotate freely but nevertheless be non-axially movable.

Carried by saddle 12 so as to be vertically movable therewith is a main driving motor 30 which is optionally shown in Fig. 5 as being of the A. C., polyphase type. Motor 30 is controlled by a switch 31 and is, for obvious reasons, variable in speed and may or may not be bi-directionally rotatable, said motor being equipped in the usual manner with an elongated drive shaft 32 which extends horizontally and in parallelism with the common axis of the unit 12—16—21—22—26 and is splined along its length, as at 33. The free end of shaft 32 extends freely through openings provided therefor in opposite walls of a hollow casing 34 which is non-rotatably fixed to the respective end of ram 16 for protraction and retraction therewith, and the portion of said shaft residing within said casing has a pinion 35 splined thereto for rotation therewith and axial movement therealong. Pinion 35 is in driving connection with a gear 36 which is operatively connected to the rear end of arbor 21 for driving same about the aforementioned axis.

Before proceeding, the foregoing may be summarized as follows: Saddle 12 and the various parts of the apparatus carried thereby may, if desired, be unitarily moved upwardly or downwardly relatively to super-structure 11 by proper manipulation of motor 15, whether or not motor 20 and/or motor 30 are operating; ram-casing-pinion unit 16—34—35, arbor-gear-screw unit 21—36—26 and spindle-tool unit 22—23 (or 24) may, if desired, be horizontally protracted or retracted as a unit relatively to said saddle and to shaft 32 by proper manipulation of said motor 20, whether or not said motor 15 and/or said motor 30 are operating; arbor 21, gear 36, spindle 22 and its tool and screw 26 may, if desired, be rotated unitarily at any speed relatively to ram 16 by proper manipulation of said motor 30, it being assumed that there is no load on said screw, whether or not said motor 15 and/or said motor 20 are operating; and, as will be further discussed, said spindle 22 may, at will, be protracted or retracted relatively to said arbor 21 by, what is to be learned, novel and improved manipulation of said screw 26.

Pinion 35 has another pinion 37 integrally secured thereto for rotation therewith under the influence of rotation of shaft 32 and about the axis thereof, and in driven connection with said pinion 37 is a gear 38 mounted on and for rotation with a shaft 39 which is supported by casing 34 for rotation about a fixed axis parallel with the axis of said shaft 32. Also carried on and for rotation with shaft 39 is a pinion 40 which is in driving connection with a gear 41 fixed on and for rotation with the drive shaft 42 of a motor, generally indicated at 43, said motor being carried by casing 34. For reasons which will soon be explained, motor 43 is of the well-known and commonly used selsyn (self-synchronizing type, it being energizable under the influence of A. C. voltage and having a rotor 44 wound with a three-circuit distributed Y-connection winding and a similarly wound stator 45. Before discussing the electrical hook-up of rotor 44 and stator 45 of motor 43, and while still assuming there is no load on screw 26, it can be seen that energization of motor 30 by the closing of switch 31 (see Fig. 5) effects simultaneous rotation of arbor-spindle-screw unit 21—22—26 and said rotor, this meaning that at this time there is no protraction or retraction of spindle 22 relatively to arbor 21 and also that rotation of said rotor at all times depends exclusively upon and is entirely controlled by rotation of said motor 30.

The rear end of screw 26 has secured thereto for rotation and axial movement therewith the driven section 46 of a standard magnetic clutch which is, as usual, disengaged when de-energized and which has a driving section 47 splined on the head end of a shaft 48 axially aligned with said screw so that said driving section may rotate with said shaft and move toward and away from said driven section in accordance with energization and de-energization of said clutch. Shaft 48 is supported for rotation about its axis by casing 34 and has a gear 49 mounted thereon for rotation therewith, said gear being in driven mesh with a pinion 50 which is secured on the drive shaft 51 of another motor, generally indicated at 52, whose design, construction and electrical characteristics are identical with those of motor 43. Motor 52 is carried by casing 34 and, for future reference, has its rotor (wound similarly as rotor 44 of motor 43) indicated at 53 and its stator (wound similarly as stator 45 of said motor 43) indicated at 54. Before discussing the electrical hook-up of motor 52 and the manner in which clutch 46—47 is energized and de-energized, it can be seen that, when said clutch is engaged, the speed and direction of rotation of screw 26 must be the same as the speed and direction of rotation of spindle 22 in order that there be no axial movement of said spindle relatively to arbor 21, for, otherwise, such relative axial movement would be set up (which, of course, is desirable in many instances and will soon be the subject of discussion). Since the function of the combination of motors 43 and 52 is the self-synchronization of each with respect to the other so that each will operate in phase and at a common speed (that is, during the absence of external disturbance, which is also to be discussed), it is, of course, necessary that the gear train between rotor 53 and screw 26 and the gear train between rotor 44 and arbor 21 be so dimensioned that, when said motors are synchronized and rotating at a common speed and clutch 46—47 is engaged, said screw and arbor will be rotating at a common speed, thereby preventing axial movement of spindle 22 relatively to said arbor at this time, and such dimensioning is contemplated.

In order to provide the aforementioned disturbing force which is necessary to introduce, when desired, a speed differential between the otherwise unitarily rotatable, self-synchronizing motors 43 and 52, a third motor (in reality a generator), generally indicated at 55, is employed and has the same design, construction and electrical characteristics as each of said motors 43 and 52, said motor 55 having a rotor 56 wound similarly as each of the rotors 44 and 53 and a stator 57 wound similarly as each of the stators 45 and 54. The drive shaft 58 of motor 55 is mechanically coupled to an axially aligned shaft 59 for being driven thereby, and said shaft 59 is supported for rotation about its axis by means of a casing 60, it being suggested at this time that said casing and motor may be either stationarily supported with respect to the parts of the apparatus carried by super-structure 11 or be supported for movement therewith, whichever is the more desirable. Shaft 59 supports a gear 61 which is in driven mesh with a pinion 62 carried on an idler shaft 63, and said shaft 63 also carries a gear 64 which is in driven mesh with a pinion 65 mounted on the drive shaft 66 of a D. C. motor, generally indicated at 67, said motor being supported on casing 60 and providing, as will be seen subsequently, the selectively applicable driving force for the device 55 of the Selsyn combination 43—52—55 and being equipped in the usual manner with an armature 68 and a shunt field 69. The electrical hook-up of D. C. motor 67 and of Selsyn motor 55 are to be discussed presently.

Speaking at present without reference to the improvements herein disclosed, described and claimed, the general principles of the differential Selsyn system, wherein any two of three electrical devices may be operated at a common speed or at different speeds depending upon mechanical and electrical inactivity or activity of the third, have been followed, it being noted in a general way in the wiring diagram set forth in Fig. 5 that the stators of said two devices are electrically connected to the single source of A. C. voltage which is provided and that the rotors of said two devices are electrically connected one to the stator of said third device and the other to the rotor of said third device. Specifically, stator 45 of motor 43 (said motor being preferably classified as a Selsyn transmitter) is electrically connected, phase for phase, to a source of polyphase A. C. voltage, indicated at 70, by means of leads 71, 72 and 73; stator 54 of motor 52 (said motor being preferably classified as a Selsyn receiver) is electrically connected, phase for phase, to said source by means of leads 74, 75 and 76; rotor 44 of said motor 43 is electrically connected, phase for phase, to stator 57 of motor 55 (said motor being preferably classified as a Selsyn differential) by means of leads 77, 78 and 79; and, rotor 53 of said motor 52 is electrically connected, phase for phase, to rotor 56 of said motor 55 by means of leads 80, 81 and 82. It will be noted that a multi-pole switch, generally indicated at 83, is employed for controlling the power input from source 70 to stators 45 and 54 and is so related to leads 71, 72 and 73 and to leads 74, 75 and 76 as to cause simultaneous excitation of each of said stators when in its closed position and simultaneous deenergization of each of said stators when in its open position. It will also be noted that motor 30, which, among other things, drives rotor 44 and arbor 21, is controlled by switch 31 independently of the position of switch 83, said switch 31 being connected to source 70 by means of leads 84, 85 and 86, so that said motor 30 may be operated with or without the Selsyn motor 43 and 52.

It will be noted that one of the three leads electrically interconnecting transmitter stator 45 and power source 70 is interrupted by a switch element 87 and that one of the three leads electrically interconnecting receiver stator 54 and said source is interrupted by a switch element 88, these two elements being carried by and unitarily movable with the core 89 of a solenoid which includes a magnetic coil 90 arranged in the usual operative manner with respect to said core. One end of coil 90 is electrically connected by means of a lead 91 to the pivotally movable armature 92 of a relay which includes a coil 93 arranged in the usual operative manner with respect to said armature and connected by leads 94 and 95 across the other two of the three leads interconnecting power source 70 and transmitter stator 45, and the other end of said coil 90 is electrically connected by means of a lead 96 to one of said two power-stator leads, the other of said two power-stator leads having a lead 97 connected thereto and being connectible with and dis-connectible from said armature upon energization and de-energization of said relay coil to energize and de-energize said solenoid coil. Relay 92—93 is of the type which has a retarded action with respect to its armature upon energization of its coil so as to provide a substantial time interval between the closing of the relay circuit and the closing of the solenoid circuit; in other words, switch elements 87 and 88 are not caused to engage the contacts provided therefor in leads 71 and 74 until a predetermined period has elapsed following the closing of switch 83. The purpose of providing solenoid 90—89, relay 93—92 and the simultaneously makable breaks in the power-stator leads 71 and 74 is to subject transmitter 43 and receiver 52 to single-phase power upon closing switch 83 to start the apparatus from a standstill and to maintain this condition until the solenoid circuit has been closed, whereafter said transmitter and receiver will be subjected to three-phase power, for it is pointed out that at single phase transmitter and receiver rotors 44 and 53 have no rotative torque but that they do have a tendency to pull into synchronism so that, when said circuit closes, they will by that time be synchronized.

Before discussing the hook-up of the magnetic clutch 46—47 and of the differential driving motor 67, but assuming said clutch is engaged and said motor is idle, it is clear that closing of switch 31 will cause motor 30 to operate and rotate arbor-spindle unit 21—22 about its axis and rotor 44 of transmitter 43 about its axis, and that closing of switch 83 will subject transmitter and receiver stators 45 and 54 to single phase power until the solenoid circuit has been closed by completed action of relay 93—92, the retarded action of said relay giving transmitter 43 and receiver 52 time to pull into phase or synchronism. When the relay circuit has closed, thereby closing the solenoid circuit and the breaks in leads 71 and 74, transmitter 43 and receiver 52 will be subjected to three-phase power and, because of their characteristics, receiver rotor 53 will be driven at the same speed as transmitter rotor 44, thus causing screw 26 to rotate at the same speed as spindle 22 without, as a result, any relative protraction or retraction therebetween. And, because of the nature and characteristics of the transmitter-receiver-differential combination 43—52—55, the then mechanically inactive differential rotor 56 of device 55 of this Selsyn combination will be electrically active in conjunction with its stator 57 as a transformer, providing merely an electrical continuity in the system.

It has already been pointed out that ram 16, arbor 21, spindle 22 and screw 26 may, when desired, be unitarily protracted or retracted relatively to saddle 12, and this is clearly true whether clutch 46—47 is engaged or disengaged or whether said arbor, spindle and screw are rotating unitarily relatively to said ram or are rotatably idle; or, in other words, said arbor, spindle and screw may, when desired, be rotated unitarily relatively to said ram whether or not they are being protracted or retracted with said ram or whether said clutch is engaged or disengaged. However, as can be seen, many occasions arise when it is desired to overthrow the unitary nature of the rotation of spindle 22 and screw 26 and provide a differential therebetween, in which event said spindle would be caused to move axially relatively to said screw (as well as to arbor 21 and ram 19, of course). To attain these ends, the aforementioned D. C. motor 67, which is mechanically coupled to rotor 56 of the Selsyn differential device 55 for driving same, is employed, its function being selectively resorted to for upsetting the synchronism of rotors 44 and 53 of the other two Selsyn devices 43 and 52 and thereby establishing the then desired differential between the rotative speeds of screw 26 and spindle 22. Armature 68 of motor 67 is electrically connected across a source of D. C. voltage, indicated at 98, by means of leads 99 and 100 (in one of which there is disposed a circuit-controlling switch 101), and across said armature the aforementioned shunt field 69 is electrically connected in the usual manner and with a variable rheostat 102 in series therewith, said rheostat being operable for selectively varying the rotative speed of said armature and having a normally open switch 103 electrically associated therewith and by the closing of which said rheostat may be short-circuited and said armature operated at its lowest possible speed. A reversing switch 104 is employed for causing armature 68 to rotate in either of its two directions and, to accomplish this purpose, is so constructed as to have two positions with respect to the ends of field coil 69, one of said positions being effective for causing energy to flow in one direction through said coil and the other of said positions being effective to cause energy to flow through said coil in the opposite direction. Furthermore, in order that armature 68 be nonresponsive to the closing of switch 101 until the circuit containing solenoid coil 90 is closed after the delay permitted by relay 93—92 upon closing switch 83, one of the two leads interconnecting said armature and D. C. power source 98 is broken (as are leads 71 and 74), the break being electrically closable upon energization of solenoid 90—89 by means of a switch element 105 carried by and unitarily movable with core 89 of said solenoid.

Reviewing the subject matter set forth in the next preceding paragraph, and assuming clutch 46—47 is energized, energization of motor 67 is for the purpose of introducing into the system including the synchronized Selsyn devices 43 and 52 an electrical disturbing force by means of the energization of Selsyn device 55 so that such synchronism may be destroyed and a relativity between the axial movements of spindle 22 and screw 26 established. Such energization of motor 67 can not occur until switches 31, 83 and 101 have been closed and solenoid coil 90 energized. The speed of motor 67 may be controlled by rheostat 102 and reduced to a minimum, if desired, by the closing of switch 103, and the direction of rotation of said motor may be controlled by proper manipulation of switch 104. It is seen, therefore, that rotation of motor 67 can have the effect of rotating screw 26 either faster or slower than spindle 22 so that said spindle may be urged inwardly or outwardly relatively to arbor 21 (and, of course, to said screw). It is also seen that, if clutch 46—47 is engaged and motor 30 is idle and receiver 52 and differential 55 are active (in which event transmitter 43 serves as a transformer and arbor-spindle unit 21—22 is rotatably inactive), the arrangement of switch 104 in one of its two positions will effectuate rotation of said screw in one of its two directions and the arrangement of said switch in the other of its two positions will effectuate rotation of said screw in the other of its two directions, thereby enabling the protraction of retraction of the rotatably inactive spindle 22 relatively to the likewise rotatably inactive arbor 21 and to the rotating screw 26 to be realized.

Referring now to the magnetic clutch 46—47, one of the two terminals thereof is seen to be connected to one of the two sides of power source 98 by means of a lead 106 and the other of said terminals is seen to be connected to the other of said sides by means of a lead 107, one of said leads being provided with a break, similarly as are leads 71, 74 and 99, which is closable upon energization of the circuit including solenoid 90—89 by means of a switch element 108 carried by and unitarily movable with core 89 of said solenoid. Though it is true that energization of solenoid 90—89, which follows shortly after the closing of switch 83, will energize clutch 46—47 and mechanically interconnect screw 26 and receiver rotor 53, such interconnection may, for reasons soon to be explained, be brought about, instead, by the closing of another switch 109 which is connected in parallel by means of leads 110 and 111, with and across two points in one of the two leads which interconnect power source 98 and said clutch. In connection with switches 83 and 109, it should be borne in mind that both should not be in closed position at the same time, for one must be open while the other is closed, and the normal position for said switch 109 is the open position because the normal position for said switch 83, during operation of the apparatus, is the closed position.

Under the conditions so far described, the greatest speed attainable by differential rotor 56 under the influence of the geared connection thereof to motor armature 68 is comparatively low but has been made so because of the ideal adaptation thereof to the "feeding" performance of spindle 22. In other words, during the actual operation of the apparatus it is desirable that the axial speed of spindle 22 relatively to arbor 21 be low, and for this reason the gearing between armature 68 and rotor 56 is such that the speed of said rotor is low even though said armature is rotating at its highest speed, this meaning that the change in the characteristics of transmitter 43 and receiver 52 caused by such rotor rotation is just sufficient to rotate screw 26 slightly faster or slower than said spindle, whereby the proper "feeding" effect is acquired. However, occasions arise (such as in setting up the apparatus or approaching a cut) when it is desired to protract or retract spindle 22 relatively to arbor 21 at a much higher speed than the aforementioned "feeding" speed, and, to attain these ends, the first thing to be done is to open switches 31, 83 and 19. This disconnects motor 30, transmitter 43, receiver 52, differential 55 and clutch 46—47 from power source 70 and it also disconnects motor 67 from power source 98. Clutch 46—47 is then re-engaged by closing switch 109 to re-institute the driving connection between screw 26 and receiver rotor 53. Receiver 52 is then operated as an induction motor by, first, short-circuiting its rotor 53 by means of a switch 112 provided therefor in proper association with leads 80, 81 and 82 and, second, by re-connecting its stator 54 to power source 70 (ahead of switch 83) by means of leads 113, 114 and 115. These three leads accommodate a switch 116 which is so connected thereto and so designed as to enable rotor 53 to be rotated in either of its two directions depending upon the arrangement of said switch in either of its two positions. Upon arranging switch 116 in either of its two closed positions, and after having performed the other above outlined duties, it can readily be seen that receiver 52 will operate as an induction motor, its rotor 53 being rotated at a fast rate in either of its two directions and screw 26 resultingly effectuating a rapid movement of spindle 22 into or out of arbor 21.

If desired, a box 117 may be employed for grouping therewithin switch 83, solenoid 90—89, relay 93—92 and switch 116. Another box 118 may be employed for grouping therewithin switches 101, 103, 104 and 109 and rheostat 102. And, still another box 119 may be employed for housing switch 112.

The structure shown in Fig. 6 is similar to that shown in Fig. 1 except that tool 24 is employed rather than tool 23, said tool 24 having a tapered shank 120 which is exteriorly complementary to the diverging end of the bore in arbor 21 for fitting frictionally thereinto. A connector 121 is employed for inter-joining spindle 22 and shank 120 of tool 24, said connector having one end shaped similarly as the shank of tool 23 for being locked into position in the socket provided in the head end of said spindle for said last mentioned shank, and said connector having its opposite end threaded for reception into a threaded socket provided in said first mentioned shank. With connector 121 lockingly interconnecting spindle 22 and tool 24, it is possible for the resulting unit to be fully retracted by turning screw 26 until shank 120 becomes frictionally locked to arbor 21. Thereafter, clutch 46—47 may be disengaged and the members 16, 21, 22, 26 and 24 unitarily rotated by rotation of gear 36 through the agency of motor 30, during which time receiver 52, differential 55 and motor 67 are mechanically and electrically idle.

Although the invention has been described with some detail, such description is for the purpose of illustration and is not to be taken as definitive of the limits of the inventive idea. The right is reserved to make such changes in the details of construction and arrangement of parts as will fall within the purview of the attached claims.

What we claim is:

1. In an apparatus of the character described a tool carrier member supported for rotation about an axis, a feeding member supported for rotation with said first member, a pair of devices having stators and rotors, said stators being electrically interconnected and in circuit with a source of energy therefor, one of said rotors being operatively connected mechanically to one of said members for being rotated thereby and the other of said rotors being operatively connected mechanically to the other of said members for rotating the latter therewith, and means electrically interconnecting said rotors and operable for equalizing the speeds thereof.

2. In an apparatus of the character described, a tool carrier member supported for rotation about an axis, a feeding member supported for rotation with said first member, a pair of devices having stators and rotors, said stators being electrically interconnected and in circuit with a source of energy therefor, one of said rotors being operatively connected mechanically to one of said members for being rotated thereby and the other of said rotors being operatively connected mechanically to the other of said members for rotating the latter therewith, and means having a rotor electrically connected to one of said first two rotors and a stator electrically connected to the other of said first two rotors and operable for maintaining an electrical balance between said devices.

3. In an apparatus of the character described, a tool carrier member supported for rotation about an axis, a feeding member supported for rotation with said first member, a pair of devices having stators and rotors, said stators being electrically interconnected and in circuit with a source of energy therefor, one of said rotors being operatively connected mechanically to one of said members for being rotated thereby and the other of said rotors being operatively connected mechanically to the other of said members for rotating the latter therewith, means having a rotor electrically connected to one of said first two rotors and a stator electrically connected to the other of said first two rotors and normally operable for maintaining an electrical balance between said devices, and means mechanically connected to said third rotor and operable for selectively rotating the latter to upset said balance.

4. In an apparatus of the character described, a tool carrier member supported for rotation about an axis, a feeding member supported for rotation with said first member, a pair of polyphase devices having stators and rotors, said stators being electrically interconnected phase for phase and in circuit with a source of polyphase energy therefor, one of said rotors being operatively connected mechanically to one of said members for being rotated thereby and the other of said rotors being operatively connected mechanically to the other of said members for rotating the latter therewith, said rotors also being electrically interconnected and operable for rotating at a common speed, and means in said circuit and operable for subjecting said devices to single phase energy for a predetermined period following the closing of said circuit.

5. In an apparatus of the character described, a tool carrier member supported for rotation about an axis, a feeding member supported for rotation with said first member, a pair of polyphase devices having stators and rotors, said stators being electrically interconnected phase for phase and in circuit with a source of polyphase energy therefor, one of said rotors being operatively connected mechanically to one of said members for being rotated thereby and the other of said rotors being operatively connected mechanically to the other of said members for rotating the latter therewith, said rotors also being electrically interconnected and operable for rotating at a common speed, normally disengaged clutch means operatively arranged between one of said rotors and one of said members, and means in said circuit and operable for subjecting said devices to single phase energy for a predetermined period following the closing of said circuit and for effectuating inter-engagement of said clutch means upon termination of said period.

6. In an apparatus of the character described, a tool carrier member supported for rotation about an axis, a feeding member for said first member and supported for rotation therewith, a plurality of electrically energizable devices each of which has a stator and a rotor, the stators of two of said devices being electrically interconnected and in circuit with a source of energy therefor and the stator of another of said devices being electrically connected to the rotor of one of said first two devices, said last mentioned rotor being mechanically connected to one of said members for being rotatably driven thereby and the rotor of the other of said first two devices being mechanically connected to the other of said members for rotatably driving the latter and electrically connected to the rotor of said third device.

7. In an apparatus of the character described, a tool carrier member supported for rotation about an axis, a feeding member for said first member and supported for rotation therewith, a plurality of electrically energizable devices each of which has a stator and a rotor, the stators of two of said devices being electrically interconnected and in circuit with a source of energy therefor and the state of another of said devices being electrically connected to the rotor of one of said first two devices, said last mentioned rotor being mechanically connected to one of said members for being rotatably driven thereby and the rotor of the other of said first two devices being mechanically connected to the other of said members for rotatably driving the latter and electrically connected to the rotor of said third device, and switch means in said circuit between the stators of said first two devices and being closable responsive to the expiration of a predetermined time interval following the closing of said circuit.

8. In an apparatus of the character described, a tool carrier member supported for rotation about an axis, a feeding member for said first member and supported for rotation therewith, a plurality of electrically energizable devices each of which has a stator and a rotor, the stators of two of said devices being electrically interconnected and in circuit with a source of energy therefor and the stator of another of said devices being electrically connected to the rotor of one of said first two devices, said last mentioned rotor being mechanically connected to one of said members for being rotatably driven thereby and the rotor of the other of said first two devices being mechanically connected to the other of said members for rotatably driving the latter and electrically connected to the rotor of said third device, said last mentioned mechanical connection including clutch means engageable responsive to the expiration of a predetermined time interval following the initiation of energy flow through said circuit.

9. In an apparatus of the character described, a tool carrier member supported for rotation about an axis, a feeding member for said first member and supported for rotation therewith, a plurality of electrically energizable devices each of which has a stator and a rotor, the stators of two of said devices being electrically interconnected and in circuit with a source of energy therefor and the stator of another of said devices being electrically connected to the rotor of one of said first two devices, said last mentioned rotor being mechanically connected to one of said members for being rotatably driven thereby and the rotor of the other of said first two devices being mechanically connected by means of an electrically energizable clutch to the other of said members for rotatably driving the latter and electrically connected to the rotor of said third device, and switch means in said circuit between the stators of said first two devices and in circuit with said clutch and being closable responsive to the expiration of a predetermined time interval following the closing of said first circuit.

10. In an apparatus of the character described, a tool carrier member supported for rotation about an axis, a feeding member for said first member and supported for rotation therewith, a plurality of electrically energizable devices each of which has a stator and a rotor, the stators of two of said devices being electrically interconnected and in circuit with a source of energy therefor and the stator of another of said devices being electrically connected to the rotor of one of said first two devices, said last mentioned rotor being mechanically connected to one of said members for being rotatably driven thereby and the rotor of the other of said first two devices being mechanically connected to the other of said members for rotatably driving the latter and electrically connected to the rotor of said third device, one of said stators being selectively connectible to said energy source upon opening of said circuit, and means operable upon said circuit opening and selective connection for short-circuiting the rotor possessed by the device possessing said last mentioned stator.

11. In an apparatus the character described, a tool carrier member supported for rotation about an axis, a feeding member for said first member and supported for rotation therewith, a plurality of electrically energizable devices each of which has a stator and a rotor, the stators of two of said devices being electrically interconnected and in circuit with a source of energy therefor and the stator of another of said devices being electrically connected to the rotor of one of said first two devices, said last mentioned rotor being mechanically connected to one of said members for being rotatably driven thereby and the rotor of the other of said first two devices being mechanically connected to the other of said members for rotatably driving the latter and electrically connected to the rotor of said third device, and selectively operable driving means effective for rotating said last mentioned rotor to change the electrical characteristics of said first two devices during rotation of the rotors thereof.

12. In an apparatus of the character described, a tool carrier member supported for rotation about an axis, a feeding member for said first member and supported for rotation therewith, a plurality of electrically energizable devices each of which has a stator and a rotor, the stators of two of said devices being electrically interconnected and in circuit with a source of energy therefor and the stator of another of said devices being electrically connected to the rotor of one of said first two devices, said last mentioned rotor being mechanically connected to one of said members for being rotatably driven thereby and the rotor of the other of said first two devices being mechanically connected to the other of said members for rotatably driving the latter and electrically connected to the rotor of said third device, electrically driven driving means mechanically connected to said last mentioned rotor whereby rotation of the latter is effective for changing the electrical characteristics of said first two devices, and a pair of switch means in series with said driving means one of which being selectively closable and the other of which being closable responsive to the expiration of a predetermined time interval following the initiation of energy flow from said source.

13. In an apparatus of the character described, a tool carrier member supported for rotation about an axis, a feeding member for said first member and supported for rotation therewith, a plurality of electrically energizable device each of which has a stator and a rotor, the stators of two of said devices being electrically interconnected and in circuit with a source of energy therefor and the stator of another of said devices being electrically connected to the rotor of one of said first two devices, said last mentioned rotor being mechanically connected to one of said members for being rotatably driven thereby and the rotor of the other of said first two devices being mechanically connected by means of an electrically energizable clutch to the other of said members for rotatably driving the latter and electrically connected to the rotor of said third device, switch means in said circuit between the stators of said first two devices and in circuit with said clutch and being closable responsive to the expiration of a predetermined time interval following the initiation of energy flow from said source, electrically driven driving means mechanically connected to said last mentioned rotor whereby rotation of the latter is effective for changing the electrical characteristics of said first two devices, and a pair of switch means in series with said driving means one of which is selectively closable and the other of which is closable responsive to said time interval expiration.

14. In an apparatus of the character described, a tool carrier member supported for rotation about an axis and for rectilinear movement along said axis, a feeding member rotatable with said first member and relatively thereto and cooperable therewith during such relative rotation for effectuating such rectilinear movement thereof, a pair of devices having stators and rotors, said stators being electrically interconnected and in circuit with a source of energy therefor, one of said rotors being operatively connected mechanically to one of said members for being rotated thereby and the other of said rotors being operatively connected mechanically to the other of said members for rotating the latter, means electrically interconnecting said rotors and normally operable for inducing same to rotate at a common speed whereby said members are induced to rotate at a common speed, and selectively operable means cooperable with said first means for introducing a relativity between said rotor speeds whereby said rectilinear movement of said carrier member is established.

15. In an apparatus of the character described, a tool carrier member supported for rotation about an axis and for rectilinear movement along said axis, a feeding member rotatable with said first member and relatively thereto and cooperable therewith during such relative rotation for effectuating such rectilinear movement thereof, a pair of devices having stators and rotors, said stators being electrically interconnected and in circuit with a source of energy therefor, one of said rotors being operatively connected mechanically to one of said members for being rotated thereby and the other of said rotors being operatively connected mechanically to the other of said members for rotating the latter, a third device having a rotor electrically connected to one of said first two rotors and a stator electrically connected to the other of said first two rotors, said third device being normally operable for inducing said first two rotors to rotate at a common speed whereby said members are induced to rotate at a common speed, and selectively operable driving means connected to said third rotor for rotating the latter so as to induce one of said first two rotors to rotate at a different speed than the other of said first two rotors whereby said rectilinear movement of said carrier member is established.

16. In an apparatus of the character described, a tool carrier member supported for rotation about an axis and for rectilinear movement along said axis, a feeding member rotatable with said first member and relatively thereto and cooperable therewith during such relative rotation for effectuating such rectilinear movement thereof, a pair of devices having stators and rotors, said stators being electrically interconnected and in circuit with a source of energy therefor, control means in said circuit between said stators and effective upon the closing of said circuit and for a predetermined period thereafter for restricting said stators to partial energization, one of said rotors being operatively connected mechanically to one of said members for being rotated thereby and the other of said rotors being operatively connected mechanically to the other of said members for rotating the latter, means electrically interconnecting said rotors and normally operable for inducing same to rotate at a common speed whereby said members are induced to rotate at a common speed, and selectively operable means cooperable with said first means for introducing a relativity between said rotor speeds whereby said rectilinear movement of said carrier member is established.

17. In an apparatus of the character described, a tool carrier member supported for rotation about an axis and for rectilinear movement along said axis, a feeding member rotatable with said first member and relatively thereto and cooperable therewith during such relative rotation for effectuating such rectilinear movement thereof, a pair of devices having stators and rotors, said stators being electrically interconnected and in circuit with a source of energy therefor, control means in said circuit between said stators and effective upon the closing of said circuit and for a predetermined period thereafter for restricting said stators to partial energization, one of said rotors being operatively connected mechanically to one of said members for being rotated thereby and the other of said rotors being operatively connected mechanically to the other of said members for rotating the latter, normally dis-engaged clutch means comprising the mechanical connection between one of said members and one of said rotors and inter-engageable responsive to the termination of said period, means electrically interconnecting said rotors and normally operable for inducing same to rotate at a common speed whereby said members are induced to rotate at a common speed, and selectively operable means cooperable with said first means for introducing a relativity between said rotor speeds whereby said rectilinear movement of said carrier member is established.

18. In an apparatus of the character described, a tool carrier member supported for rotation about an axis and for rectilinear movement along said axis, a feeding member rotatable with said first member and relatively thereto and cooperable therewith during such relative rotation for effectuating such rectilinear movement thereof, a pair of devices having stators and rotors, said stators being electrically interconnected and in circuit with a source of energy therefor, control means in said circuit between said stators and effective upon the closing of said circuit and for a predetermined period thereafter for restricting said stators to partial energization, one of said rotors being operatively connected mechanically to one of said members for being rotated thereby and the other of said rotors being operatively connected mechanically to the other of said members for rotating the latter, means electrically interconnecting said rotors and normally operable for inducing same to rotate at a common speed whereby said members are induced to rotate at a common speed, and selectively operable means cooperable with said first means for introducing a relativity between said rotor speeds whereby said rectilinear movement of said carrier member is established, operation of said third means being dependent upon the expiration of said period.

HENRY EARL MORTON.
ROLLIN HARRISON PATRICK.
OREN G. RUTEMILLER.